United States Patent
Bhatia et al.

(10) Patent No.: US 6,412,054 B1
(45) Date of Patent: Jun. 25, 2002

(54) STORAGE DISK DECLUSTERING METHOD

(75) Inventors: Randeep S. Bhatia, Plainfield; Rakesh K. Sinha, Manville; Chung-Min M. Chen, Basking Ridge, all of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/556,728

(22) Filed: Apr. 21, 2000

Related U.S. Application Data

(60) Provisional application No. 60/147,878, filed on Aug. 9, 1999.

(51) Int. Cl.[7] ............................................. G06F 13/00
(52) U.S. Cl. ............................ 711/170; 711/4; 711/114; 707/2
(58) Field of Search ...................... 707/8, 101, 104, 707/2; 714/6; 369/30; 395/603, 508, 182.04; 711/170, 4, 114

(56) References Cited

U.S. PATENT DOCUMENTS

| | | | | |
|---|---|---|---|---|
| 5,317,731 A | * | 5/1994 | Dias et al. ..................... | 707/8 |
| 5,448,727 A | * | 9/1995 | Annevelink ................. | 707/101 |
| 5,559,764 A | * | 9/1996 | Chen ........................... | 369/30 |
| 5,692,174 A | * | 11/1997 | Bireley et al. ............... | 395/603 |
| 5,699,503 A | * | 12/1997 | Bolosky et al. ......... | 395/182.04 |
| 5,799,174 A | * | 8/1998 | Muntz et al. ................ | 395/508 |
| 5,878,409 A | * | 3/1999 | Baru et al. ..................... | 707/2 |
| 6,079,028 A | * | 6/2000 | Ozden et al. ................... | 714/6 |
| 6,272,501 B1 | * | 8/2001 | Baumann ..................... | 707/104 |

OTHER PUBLICATIONS

H.C. Du, et al, Disk Allocation for Cartesian Product Files on Multiple–Disk Systems, ACM Transactions on Database Systems, vol. 7, No. 1 (Mar. 1982), at 82–101.
H.C. Du, Disk Allocation Methods for Binary Cartesian Product Files, Bit 26 (1986) at pp. 138–147.
M. Kim, et al, Optimal File Distribution for Partial Match Retrieval, Proc. ACM SIGMOD conf. (1988) at 173–82.
C. Faloutsos et al, Disk Allocation Methods Using Error Correcting Codes, IEEE Trans. on Computers v. 40 (Aug. 1991) at pp. 907–914.
C. Faloutsos, et al, Declustering Using Fractals, Proc. Int'l Conf. on Parallel and Distributed Information Systems (1993) at 1–17.
S. Prabhakar, et al, Cyclic Allocation of Two–Dimensional Data, Proc. IEEE Int'l Conf. on Data Engineering at 94–101 (1998).

\* cited by examiner

*Primary Examiner*—David Hudspeth
*Assistant Examiner*—Fred F. Tzeng
(74) *Attorney, Agent, or Firm*—Law Office of Leo Zucker

(57) ABSTRACT

A method of declustering data among a number of storage units, e.g., disks, to minimize response time for range queries. Data to be stored is identified in the form of a dataset, wherein the data is divided among uniform data blocks (x, y) and each data block is to be stored in one of a number (M) of storage units each of which has an associated seek time. M pairs (i, $key_i$) are defined wherein i=0,1, ... m−1 and $key_i$ is the fractional part of $2i/(1+\sqrt{5})$. First components of the pairs are ordered according to an ascending order of the $key_i$ values of the pairs, thus defining a permutation array A of size M. Another permutation array B is defined such that for i=0,1, ... ,M−1 B[a(i)]=i, and data block (x,y) is assigned to storage unit (x−B[y mod M])mod M, wherein mod is the remainder function.

8 Claims, 9 Drawing Sheets

2-D DATASET

A QUERY THAT CONTAINS SIX BLOCKS

A QUERY THAT CONTAINS FOUR BLOCKS

DATA BLOCK AT COORDINATE (7, 2) IS ASSIGNED TO DISK 5

FIG. 7

| 4 | 5 | 0 | 1 | 2 | 3 | 4 | 5 | 0 |
|---|---|---|---|---|---|---|---|---|
| 2 | 3 | 4 | 5 | 0 | 1 | 2 | 3 | 4 |
| 0 | 1 | 2 | 3 | 4 | 5 | 0 | 1 | 2 |
| 5 | 0 | 1 | 2 | 3 | 4 | 5 | 0 | 1 |
| 3 | 4 | 5 | 0 | 1 | 2 | 3 | 4 | 5 |
| 1 | 2 | 3 | 4 | 5 | 0 | 1 | 2 | 3 |
| 4 | 5 | 0 | 1 | 2 | 3 | 4 | 5 | 0 |
| 2 | 3 | 4 | 5 | 0 | 1 | 2 | 3 | 4 |
| 0 | 1 | 2 | 3 | 4 | 5 | 0 | 1 | 2 |

STORAGE DISK DECLUSTERING METHOD

CROSS REFERENCE TO RELATED APPLICATION

This application claims the benefit of U.S. Provisional Application No. 60/147,878 filed Aug. 9, 1999, and entitled "Declustering Using Golden Ratio Sequences".

BACKGROUND OF THE INVENTION

1. Field of the Invention

This invention relates to a method of declustering data among a number of data storage units or disks.

2. Discussion of the Known Art

As the density and capacity of information storage media increase, the need of modern scientific and business applications for mass data storage also grows. For example, data sensed by earth orbiting satellites is typically collected and stored in remote-sensing databases. In the year 2000, United States satellites alone are expected to transmit about one terabyte of data to earth daily for storage.

While media for accommodating terabytes of data storage are now available, efficient retrieval of the stored data often remains a problem. Specifically, current disk storage technology has inherent mechanical limitations that tend to limit the speed and the efficiency with which data can be retrieved from a number of storage disks, each of which has a minimum seek time. One approach to improve input/output storage speed (bandwidth) is to distribute data blocks among multiple disks, so that the blocks can be retrieved in parallel, i.e., during overlapping disk seek periods.

If data blocks of files are partitioned and stored among a number of disk storage units, then an efficient declustering scheme is important to ensure that the data blocks can be retrieved quickly from all units in which blocks of a requested file are stored. Satisfactory declustering schemes ensure that data blocks requested by a given query will in fact have been initially distributed to different disks.

Consider multidimensional data that is organized as a uniform data grid, for example, geospatial data that can be mapped in a two-dimensional raster format. In this format, a dataset is divided into columns and rows of "tiles", each of which is assigned to and stored as a separate data block on one of a number of disks. Spatial range queries against the dataset are expressed as rectangular clips on the map. Thus, all tiles within the boundary of a rectangle corresponding to a given query must be retrieved. In a multi-disk system, the response time for the query is therefore influenced mostly by the access time of that disk which stores the most tiles within the rectangle.

Various declustering schemes have been proposed to reduce response time for multidimensional queries, including some proposed specifically for uniform data grids. Other known schemes are more suitable for non-uniform data grids.

Problem Definition

Consider a dataset organized as a grid of $N_x \times N_y$ tiles (i.e., $N_x$ columns and $N_y$ rows). Given M disks, a declustering scheme, s: $N_1 \times N_2 \rightarrow M$, assigns tile (x,y) to the disk numbered s(x,y). A "range query" is a query that retrieves a rectangular set of tiles contained within the grid. Let $tile_i(s,Q)$, i=0, 1, . . . ,M−1, represent the number of tiles in Q that get assigned to disk i under declustering scheme s (parameter s is omitted when clear from the context). Define the (nominal) response time of query Q under scheme s to be $RT(s,Q) = \max_{0 \leq i < M} tile_i(s,Q)$. A unit of response time may be considered the average disk access time (including seek, rotational, and transfer time) to retrieve a data block. Thus, the notion of response time indicates an expected I/O delay for answering a given query. The problem, therefore, is how to devise a declustering scheme that minimizes the query response time.

An ideal declustering scheme would achieve, for each query Q, an optimal response time $ORT(Q) = \lceil |Q|/M \rceil$, where |Q| is the number of tiles in Q. It has been shown that such a scheme, known as the Strictly Optimal (SO) scheme, does not exist in general, except for a few stringent cases. The SO scheme thus serves as a lower bound against which performance of other schemes may be measured.

An early scheme proposed for data declustering is the Disk Modulo (DM) scheme, which assigns tile (x,y) to disk number (x+y) mod M. A known Field Exclusive-Or (FX) scheme assigns tile (x,y) to disk number dec(bi(x) $\oplus$ bi(y)) mod M. Here, bi(x) is the binary representation of x, and dec(z) is the decimal number corresponding to the binary representation z.

A so-called Hilert Curve Allocation Method (HCAM) imposes a linear ordering on the tiles in the grid, and assigns disk numbers 0,1, . . . M−1 to the tiles in a round robin fashion according to the linear ordering. HCAM has been shown to yield better performance than previously known schemes, including DM and FX.

Recently, it was shown that a family of Cyclic Declustering (CD) schemes, a simple generalization of the Disk Modulo scheme, outperforms HCAM. Given M disks, the CD schemes assign tile (x,y) to disk numbered (x+H·y) mod M, where H, called the skip value, is a predetermined parameter. To find a good skip value (or good skip values for multidimensional data), two heuristics-based schemes were proposed, both of which outperformed HCAM. One scheme (GFIB) is based on Fibonacci numbers, and the other (EXH) is based on an exhaustive search of the best skip values. When $M = F_k$ is the k-th Fibonacci number, the GFIB scheme uses the skip value $H = F_{k-1}$. The EXH scheme evaluates performance for each possible value of H, and chooses the one with the best performance. The performance is evaluated in terms of "average response time", which is taken against all queries within an M×M grid.

Extensions of GFIB and EXH for multidimensional data have been given. For d-dimensional data, the CD schemes map tile $(x_0, x_1, \ldots, x_{d-1})$ to the disk numbered $(x_0 + H_1 x_1 + \ldots + H_{d-1} x_{d-1})$ mod M. When $M = F_k$ is the k-th Fibonacci number, GFIB uses skip values: $H_1 = F_{i-1}$, $H_2 = F_{i-2}, \ldots H_{d-1} = F_{i-d+1}$. The EXH scheme performs a greedy exhaustive search. First, the best value for $H_1$ is determined by considering all queries in a M×M grid. Then, fixing $H_1$, EXH determines the best value for $H_2$ (among the candidates 1, 2, . . . ,M) by considering all 3D queries in a grid of size M×M×M. The process proceeds toward higher dimensions until all skip values are found.

It has been shown that EXH has average performance close to the Strictly Optimal scheme, and that it outperforms GFIB. EXH requires substantial computational overhead with respect to GFIB in determining the skip values, however. This renders EXH impractical for multidimensional data, and feasible only for small values of M or for small dimension data.

Golden Ratio Sequences (GRS) are highly regular sequences in which elements of certain sets are almost uniformly distributed. The sequences themselves were developed in A. Itai, et al., A Golden Ratio Control Policy For a Multiple-Access Channel, IEEE Trans. on Automatic Control, AC-29:712–718 (1984), and are based on an open addressing hashing method described in D. E. Knuth, The Art of Computer Programming, v.3, Addison-Wesley (1973). The golden ratio sequences have been applied in packet routing, see H. Hofri, et al., Packet Delay Under the Golden Ratio Weighted TDM Policy in a Multiple-Access Channel, IEEE Trans. on Information Theory, 11–33:341–349 (1987), and were recently used in A. Bar-Noy, et al, Minimizing Service and Operations Cost of Periodic Scheduling, 9th Annual ACM-SIAM Symp. on Discrete Algorithms (1998) to develop almost optimal procedures for hard problems such as minimizing mean response time in Broadcast Disks, Teletext Systems, and Maintenance Scheduling problems. As far as is known, however, GRS has not been applied to solving the problem of obtaining an efficient data storage declustering scheme.

SUMMARY OF THE INVENTION

According to the invention, a method of declustering data among a number of storage units to minimize response time for range queries, includes identifying data to be stored in the form of a dataset, wherein data is divided among uniform data blocks (x, y), and each data block is to be stored in one of a number (M) of storage units. M pairs (i, $key_i$) are defined wherein i=0,1, . . . ,M−1; and $key_i$ is the fractional part of $2i/(1+\sqrt{5})$. First components of the pairs are ordered according to an ascending order of the $key_i$ values associated with the pairs, thus defining a permutation array A of M. Another permutation array B is defined such that, for i=0,1, . . . ,M−1; B[A(i)]=i. Data block (x, y) is then assigned to storage unit (x−B[y mod M]) mod M, wherein mod is the remainder function.

For a better understanding of the invention, reference is made to the following description taken in conjunction with the accompanying drawing and the appended claims.

BRIEF DESCRIPTION OF THE DRAWING

In the drawing:

FIG. 7 illustrates a data block assignment for a 9 by 9 grid dataset for six disks;

DETAILED DESCRIPTION OF THE INVENTION

The present declustering scheme, which applies to uniform data grids, is based on golden ratio sequences. It has been discovered that if data points that are assigned to a given disk of a multiple disk storage system are selected based on the GRS, highly desirable response time performance is achieved for a broad range of available disks.

Analysis and simulation discussed below, show that a GRS declustering scheme is the best possible (in a worst case measure) scheme when the number of disks M≦22, and has performance of at most only three time units more than that of a best possible scheme for M≦550. Simulation has also shown that GRS outperforms the cyclic declustering scheme both in two and three dimensions. The GRS declustering scheme disclosed herein is also highly amenable to analysis in context to most other known declustering schemes, many of which have defied rigorous mathematical analysis for some time. Analytical results obtained further suggest that performance of the GRS declustering scheme is, on average, very close to optimal, and that a worst case performance of the scheme is within a small factor of the optimal. For large queries, the scheme is almost optimal even in a worst case. As far as is known, these are the first non-trivial theoretical guarantees on performance of any declustering scheme.

A goal of the present GRS scheme is to determine how to distribute multidimensional data across multiple disks, so the time to retrieve the data in answering a "range query" can be minimized. It is assumed that all disks are substantially identical with respect to seek time.

Figure 1:
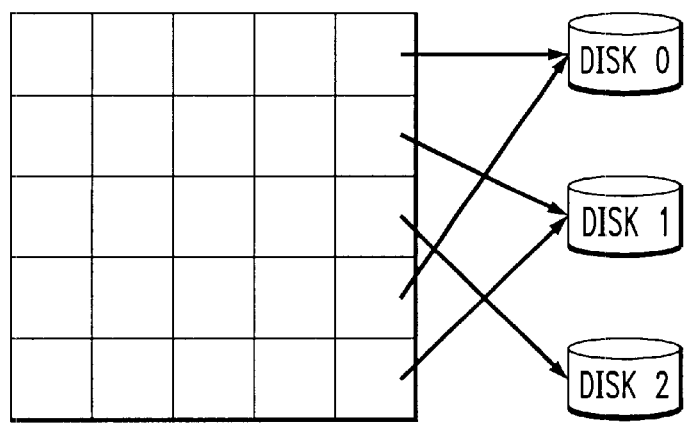
FIG. 1 is a representation of a two-dimensional image dataset having blocks of data to be stored among three disks.

Consider storing a two-dimensional image dataset on multiple disks, as in FIG. 1. The data is divided into columns and rows of "blocks", where each block is to be stored in one of the disks. The retrieval of a block from the disk costs a certain amount of time. This amount of time is dominated by a component called "seek time" i.e., the time for the disk to position its read/write head from a current location to a requested block. In the following, seek time is used as a relative time unit.

End-users typically are interested only in a subset of an underlying dataset (as the dataset is too large to fit in RAM, or to render a full-screen visualization). Accordingly, only a rectangular subset of the dataset usually must be fetched from any one disk. Such a rectangular subset is called a range query, or "query" for short.

Figure 2:
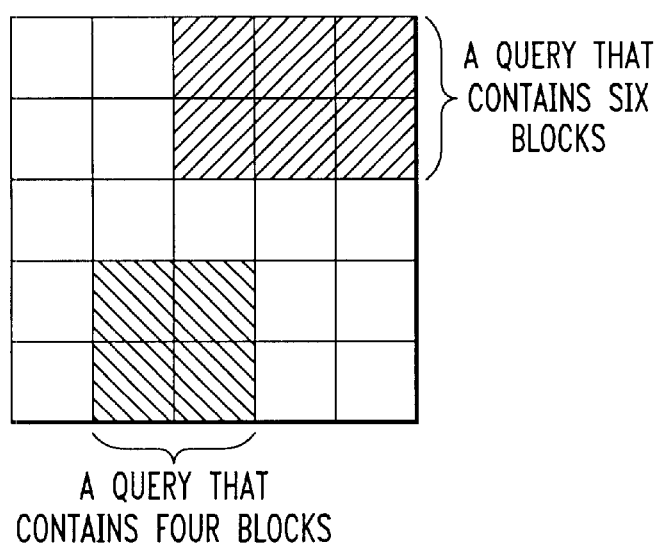
FIG. 2 shows examples of range queries of the dataset in FIG. 1.

FIG. 2 shows some examples of range queries. The response time of a query is defined as the time needed to retrieve the blocks contained in the query from the associated disks. Thus, the inventive GRS scheme aims to minimize response time as much as possible for range queries involving a number of disks on which data responsive to the query is stored.

Figure 3:
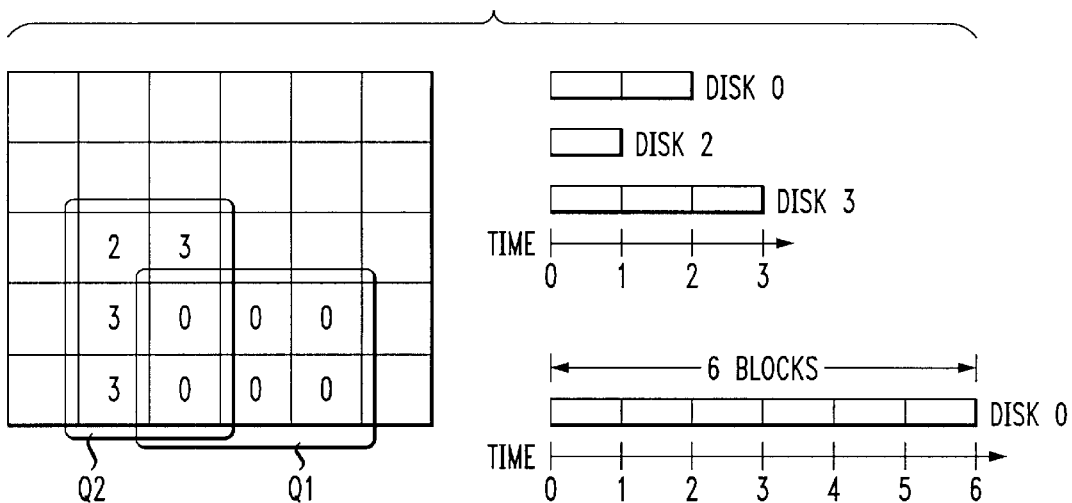
FIG. 3 illustrates two queries calling for blocks of stored data.

Consider first an arbitrary query that contains N blocks. If N blocks are to be retrieved from only one disk, and each block requires one seek unit of time to retrieve, the total time to retrieve these blocks is N units. Consider query Q1 in FIG. 3. It contains six blocks to be retrieved from the same disk (disk 0) and, thus, has a response time of 6 units. If the data blocks are retrieved from among more than one disk, then the blocks can be fetched in parallel. In such a case, the total time required to retrieve the blocks corresponds only to the maximum number of blocks held by any one of the disks. Query Q2 in FIG. 3 represents such a situation. Like Q1, query Q2 also contains six blocks. But since the blocks are stored among 3 different disks (disks 0, 2, 3), they can be retrieved in parallel. The response time for Q2 is therefore not more than the longest access time required among the three disks, which in this example is three units for the disk on which three of the six blocks responsive to query Q2 are stored.

Figure 4:
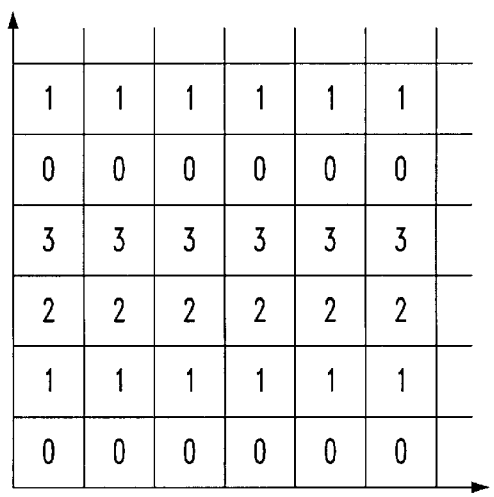
FIG. 4 represents a data declustering scheme in which each row of data blocks is assigned to a common disk.
Figure 5:
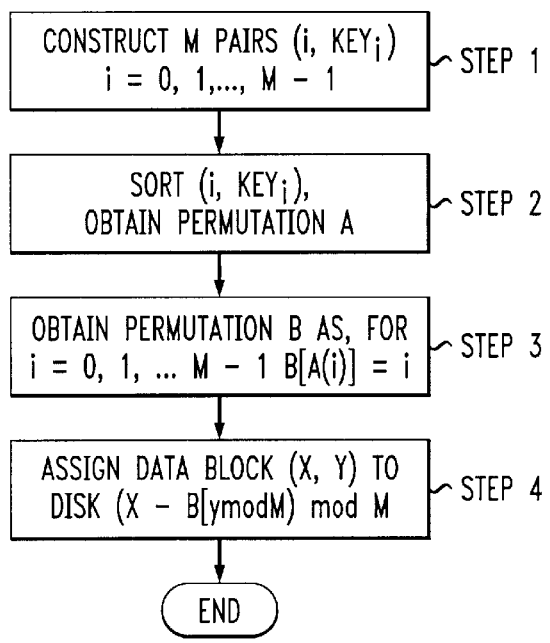
FIG. 5 is a flow chart illustrating steps of a declustering method according to the invention.

Accordingly, the response time for a given query depends on how the corresponding data blocks are distributed among a certain number of disks, i.e., the so-called declustering problem. FIG. 4 shows an example of a "bad" scheme, in which each row of data blocks in a two-dimensional array is assigned to the same disk. With such a scheme, a query that contains blocks that lie within a given row will have a worst possible response time, since all blocks come from the same disk and have to be retrieved in sequence from the one disk. Golden Ratio Sequences (GRS) Scheme Given M disks (numbered 0,1, ..., M−1) and a two-dimensional dataset of an arbitrary number of columns and rows, denote the data block located on the x'th column and y'th row by coordinate (x,y). The GRS scheme assigns the blocks among the M disks in the following four steps. The steps use an example of M=6. See FIG. 5.

Step-1: Construct M pairs (i, $key_i$) for i=0,1, ..., M−1, where $key_i$ is the fraction part of $2i/(1+\sqrt{5})$. For example, when M=6, the pairs are (0, 0), (1, 0.62), (2, 0.24), (3, 0.85), (4, 0.47), (5, 0.09).

Step-2: Sort the first components of the (i, $key_i$) pairs based on the $key_i$ values, in ascending order. The resulting sequence is a permutation of 0,1, ..., M−1. Store the permutation in an array A of size M. Following the present example, A=0, 5, 2, 4, 1, 3.

Step-3: Compute an inverse permutation as another array B, as:

for i=0,1, ... M−1, B[A[i]]=i.

Following the example, B=0, 4, 2, 5, 3, 1

Step-4: Assign or map data block (x,y) to disk (x−B[y mod M])mod M. Where "mod" is the remainder function (e.g., 7 mod 2=1, 10 mod 4=2, and the like).

Figure 6:
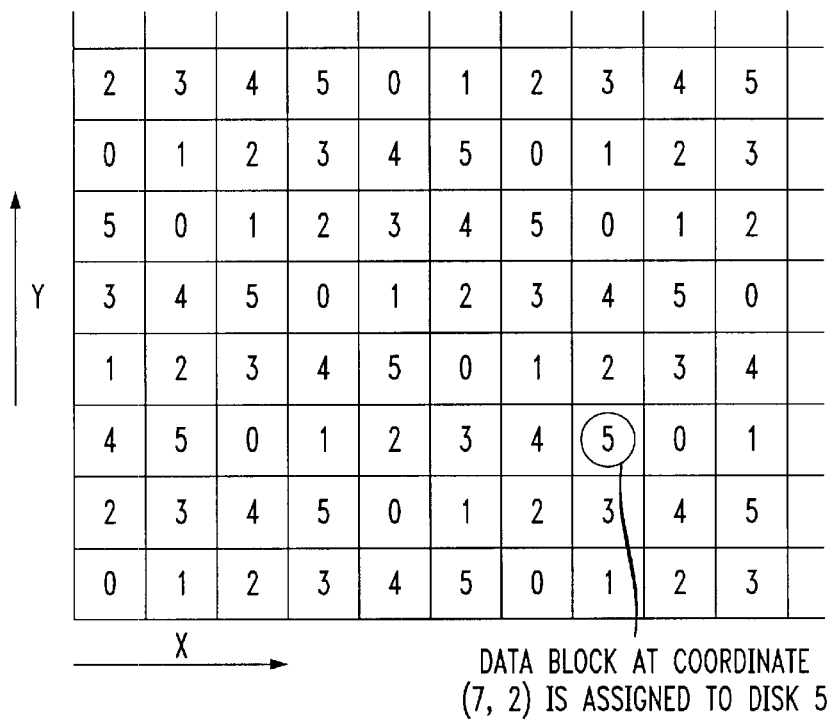
FIG. 6 illustrates a data block assignment for a 10 by 8 grid dataset.

FIG. 6 shows a GRS assignment result for a 10×8 dataset. Each grid cell is a data block, and the number in the cell indicates the disk to which the block is assigned. For example, data block (7,2) gets assigned to disk (7−B[2 mod6]) mod 6=(7−B[2]) mod 6=(7−2) mod 6=5 mod 6=5. FIG. 7 shows the result of applying the present method to a 9 by 9 grid (with the origin (0,0) at the southwest corner).

Significant advantages of the present GRS scheme have been found as follows:

Guaranteed worst case performance: When the number of disks is no greater than 21, GRS gives the shortest possible response time for any query. When the number of disks is no greater than 500, GRS guarantees that the response time of any query is at most 3 plus the best possible response time. Note that, in general, no scheme can give best possible response times for all queries.

Close to optimal average response time: GRS's average response time is typically within 1.14 of the best possible response time.

Easy to compute: Schemes based on "brute-force" efforts take a very long time (hours or even days for 3D data) to determine a best assignment. The present GRS scheme usually takes only a few seconds.

The present GRS declustering scheme is based on a GRS sequence, i.e., a permutation over $\{0,1,2, \ldots, M-1\}$. In general, given a permutation σ over $\{0, 1, 2 \ldots M-1\}$, one can define a σ-declustering as mapping point (i,j) to disk $(i-\sigma^{-1}(j \bmod M)) \bmod M$. Many of the earlier proposed declustering schemes are instances of permutation declustering schemes. For example, the DM scheme which maps (i,j) to (i+j) mod M is a permutation scheme with $\sigma(j)=(h^{-1}j)$ mod M, as long as h is relatively prime to M. Fixing a σ results in a specific declustering scheme. It can be shown that the performance of a a-declustering scheme is closely related to the distribution of elements in σ.

It can be shown that the GRS sequences are permutations whose behavior is close to ideal with respect to a declustering scheme. The sequences are based on Fibonacci numbers and golden ratios.

Fibonacci numbers are defined as follows: $F_0=0$, $F_1=1$, and recursively $F_k=F_{k-1}+F_{k-2}$ for $k\geq 2$. The sequence is therefore 0, 1, 1, 2, 3, 5, 8, 13, 21, 34, 55, 89, 144, 233, ... The inverse of the golden ratio, $2/\sqrt{5}+1\approx 0.618$, is the limit of $F_{k-1}/F_k$. It can also be shown that when M is a Fibonacci number, the present GRS sequence on $\{0,1, \ldots, M-1\}$, GRS(M), is very close to ideal. The following desirable results are also obtained with the present scheme if the number of disks M is selected to be a Fibonacci number greater than one.

1. Let Q be a query such that both dimensions of Q are at most M. Then the response time of Q is at most three times optimal response time.

2. Let Q be a query such that one dimension of Q is at most M, and the other dimension is at least M. Then the response time of Q is at most three times its optimal response time.

3. Let Q be a query with $r_1M+r_2$ rows and $c_1M+c_2$ columns, where $r_1,c_1 \geq 1$ and $0 \leq r_2, c_2 < M$. Then the response time of Q is at most $1+2/(r_1c_1+3)$ times optimal response time.

Average Response Time of GRS Scheme

The traditional method of comparing average response times of various declustering schemes is to run simulations. In addition to simulation results, analytical evidence of a good average response time of the GRS scheme was obtained.

Specifically, if M is a Fibonacci number, the average response time of the present GRS-clustering scheme for an M×M grid was found to be at most 1.14 times optimal over a full range of queries for a given dimension dataset of r rows and c columns.

Multidimensional GRS

Let σ be the GRS permutation, and let the d-dimensions be denoted by $X_1, X_2 \ldots X_d$. Let $(x_1, x_2, \ldots x_j)$ denote a point with coordinate $x_i$ in dimension $X_i$. A d-dimensional GRS declustering scheme corresponds to mapping point (with all operations modulo M) $(x_1,x_2, \ldots x_d)$ to disk $x_d-\sigma^{-1}(x_{d-1}-\sigma^{-1}(x_{d-2}- \ldots))$.

Refer to this generalized scheme as GRS-1, and note that this is a generalization of a two-dimensional GRS declustering scheme which maps point $(x_1,x_2)$ to disk $(x_2-\sigma^{-1}(x_1))$, with all operations modulo M. A declustering scheme is desired in which two points that are mapped to the same disk are either "well" declustered in the dth dimension, or are "well" declustered when projected onto the first d−1 dimensions. A recursive construction of the declustering scheme is thus suggested.

It can be shown that the d-dimensional GRS declustering scheme has the following interpretation in terms of a (d−1) dimensional GRS declustering scheme. Let a grid be of size $N_1 \times N_2 \times \ldots N_d$, ($N_i$ is side-length in dimension $X_i$) and let the number of disks be M. Let $Disk_p(q)$ denote a set of points in $X_1, X_2, \ldots X_p$, that are mapped to disk q in the GRS declustering scheme when applied to p-dimensions $X_1, X_2, \ldots X_p$ for grid size $N_1 \times N_2 \ldots N_p$ and M disks. It can be shown that the present declustering scheme defines $Disk_d(j)$ recursively as follows (addition and the permutation operation are done modulo M):

$$(y_1, y_2 \ldots y_{d-1}) \in Disk_{d-1}(i) \Leftrightarrow (y_1, y_2, \ldots y_{d-1}, \sigma^{-1}(i)+j) \in Disk_d(j)$$

For example, the set of points that are mapped to disk 0 in the d-dimensional grid are given by $(y_1, y_2 \ldots y_{d-1}, \sigma^{-1}(i))$ where $(y_1, y_2 \ldots y_{d-1})$ gets mapped to disk i by the present declustering scheme, when applied to the grid corresponding to the first (d−1) dimensions. This in turn means that the points in $Disk_d(0)$ which have coordinate $y_d=\sigma^{-1}(i)$, when projected to the d−1 dimensions $X_1, X_2, \ldots X_{d-1}$, correspond to the points assigned to $Disk_{d-1}(i)$. Note that the points in $Disk_d(0)$ which have coordinate $y_d=\sigma^{-1}(i)$ are "well" declustered, since they are "well" declustered in the d−1 dimensions $X_1, X_2, \ldots X_{d-1}$. On the other hand, points which are not "well" declustered in the d−1 dimensions $X_1, X_2, \ldots X_{d-1}$ (such as a pair of points, one from $Disk_{d-1}(i)$ and the other from $Disk_{d-1}(i+1)$) get "well" declustered in the $y_d$ coordinate (since these pairs of points have $y_d$ coordinate $\sigma^{-1}(i)$ and $\sigma^{-1}(i+1)$ respectively).

Simulation results obtained for the GRS-1 scheme show much better performance than that of a 3-dimensional GFIB scheme, but not as good as a EXH declustering scheme. The difference is most pronounced when M is a Fibonacci number. It was also observed that the behavior of the EXH scheme when $M=F_k$ is the k-th Fibonacci number, can be closely modeled by a scheme which maps point (x, y, z) to the disk $(x-GRS_2^{-1}(y \bmod M)-GRS_3^{-1}(z \bmod M) \bmod M$. The permutation $GRS_k(M)$ and its inverse $GRS_k^{-1}(M)$, where k=2,3, . . . , are computed the same as the permutations GRS(M) and its inverse $GRS^{-1}(M)$, except that in the construction the inverse of the golden ratio $\phi=2/(1+\sqrt{5})$ is replaced by $\phi^k$, i.e., the first step in the computation of the permutation is changed to:

Step-1: Construct M pairs (i, $key_i$) for $0 \leq i < M$, where $key_i$ is the fractional part of $(2/(1+\sqrt{5}))^k i$.

This scheme is referred to as GRS-2. A hybrid scheme for 3-dimensional data is thus proposed, which uses the best of the two schemes (GRS-1 and GRS-2). Simulation results obtained show that the hybrid scheme outperforms GFIB and has comparable performance to EXH for 3-dimensional data.

Performance Evaluation

Simulation involving various query loads has been used to show that cyclic declustering schemes outperform previous schemes (including HCAM, DM, and FX). See S. Prabhaker, et al., Cyclic Allocation of Two-Dimensional Data, 14th Int. Conf. on Data Engineering (1998), and Efficient Retrieval of Multidimensional Datasets through Parallel I/O, 5th Int. Conf. on High Performance Computing (1998). The present GRS method was therefore compared to the cyclic declustering schemes when evaluating performance results.

The range of the number of disks tested varied from four to several hundred. This range is realistic since commercially available disk storage systems include more than 120 disks in a single enclosure. These systems typically use I/O bus architectures which deliver up to, e.g., 100 MB/sec, to accommodate the aggregate bandwidth required by parallel data streams from the disks.

Worst Case Performance

In practice, GRS can be shown to yield a response time that is very close to optimal. Actually, the response time (RT) of any query Q using GRS is at most ORT(Q)+4, when the number of disks is less than 550. This performance is better than that of the GFIB scheme. It is also noted that the EXH scheme does not have a bounded additive performance with respect to the optimal, even for M=38.

Fixing M (number of disks), use $\max_{all\ Q}(RT(Q)-ORT(Q))$ as a criterion for worst case performance evaluation. Define this metric the "maximum deviation from optimum" (or "max_dev"). To find max_dev(M), an infinite number of queries must theoretically be considered (note that grid size is not scoped in the definition of max_dev). The properties of "permutation" declustering schemes allow max_dev(M) to be obtained by considering only a finite set of queries, however.

Figure 8:
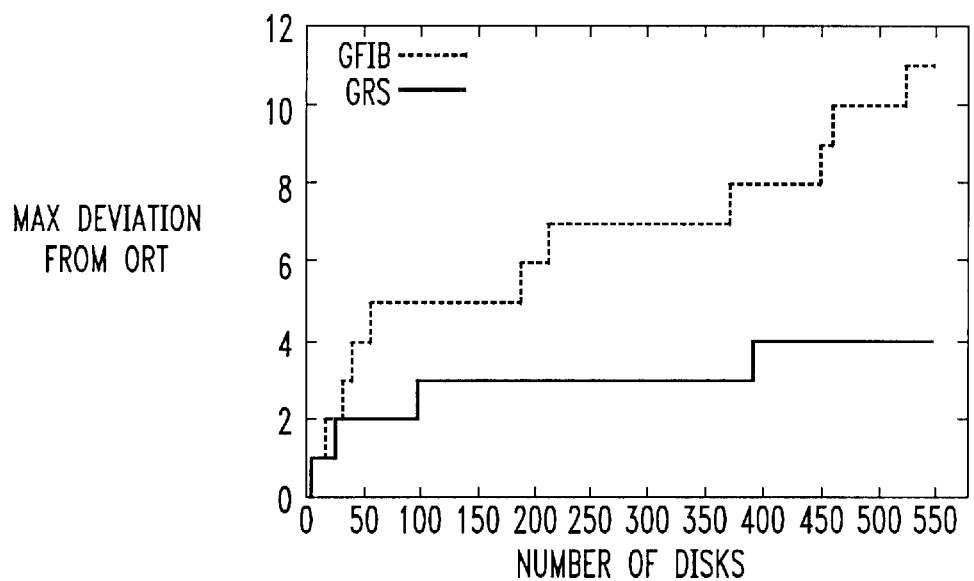
FIG. 8 is a graph showing a maximum deviation of the present declustering scheme, from an optimum scheme.

FIG. 8 shows GRS's maximum deviation from optimum, with the number of disks ranging from 1 to 550. Corresponding results for GFIB are shown for comparison. For ease of readability, FIG. 8 plots, for each x, $y=\max_{2 \leq m \leq x}$ max_dev(m). This produces a step function more amenable to visual examination.

Figure 9:
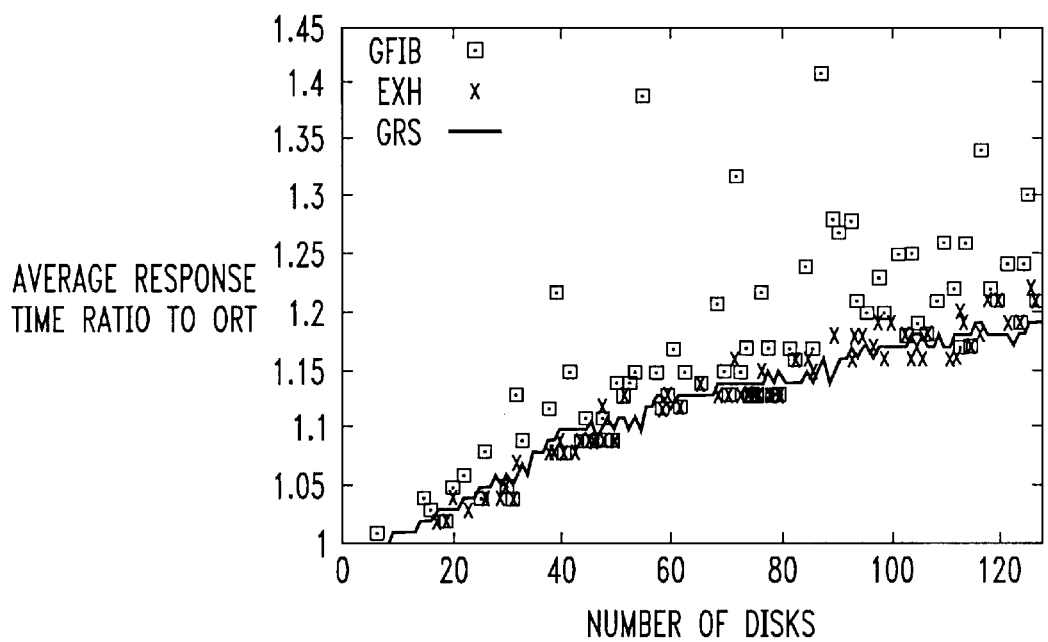
FIG. 9 compares performance of the present scheme with two other known declustering schemes on an average-by-area metric.

FIG. 9 shows that, for any query Q, GRS guarantees a response time within ORT(Q)+1 when $M \leq 22$, ORT(Q)+2 when $M \leq 94$, ORT(Q)+3 when $M \leq 391$, and ORT(Q)+4 when $M \leq 550$. The results also suggest that the worst case ratio to the optimum–3ORT–occurs only for small values of ORT. When $M \leq 550$, it occurs only when ORT=1.

The GFIB scheme, while giving good performance when M is a Fibonacci number, produces less efficient performance than GRS on non-Fibonacci numbers overall. As FIG. 9 shows, its deviation from optimum grows at a rate faster than that of GRS, and reaches as high as 11 when $M \geq 525$.

Also, it was found that EXH produces a response time of at most ORT(Q)+3 for $M \leq 223$. Comparing GRS to EXH, GRS schemes can be obtained efficiently for large M (finding the golden ratio sequence takes only O(M logM) steps). Even for the range of number of disks ($M \leq 223$), GRS performs no worse than EXH in terms of maximum deviation from the optimum.

Average Case Performance

Fixing M and a grid size, various ways are known to define the "average response time" of a declustering scheme over all queries within a grid. Given a scheme, the "average-by-area" metric first computes the ratio RT(Q)/ORT(Q) for all queries Q. Next, it averages the ratios for all queries of the same query area (e.g., queries of area 12 includes those with side-lengths (1,12), (12,1), (4,3), (3,4), (6,2), and (2,6)). Finally, the average among all possible query areas is taken. The use of this cost metric is justified by the fact that ORT(Q) depends only on the area of Q. The "average-by-shape" cost metric is the same as "average-by-area" except it first takes the average among all queries with the same shape (i.e., queries having the same numbers of rows and columns) instead of the same area. Finally, an "average-by-all" cost metric averages the ratio (to ORT) among all possible queries. All queries with an area of one in the calculation are excluded, so performance is not exaggerated due to optimality of such queries.

The simulation results show that relative performance among the evaluated schemes is not sensitive to the average cost metric used. Thus, except for the first set of experiments, results only in the "average-by-area" cost metric are shown.

Figure 10:
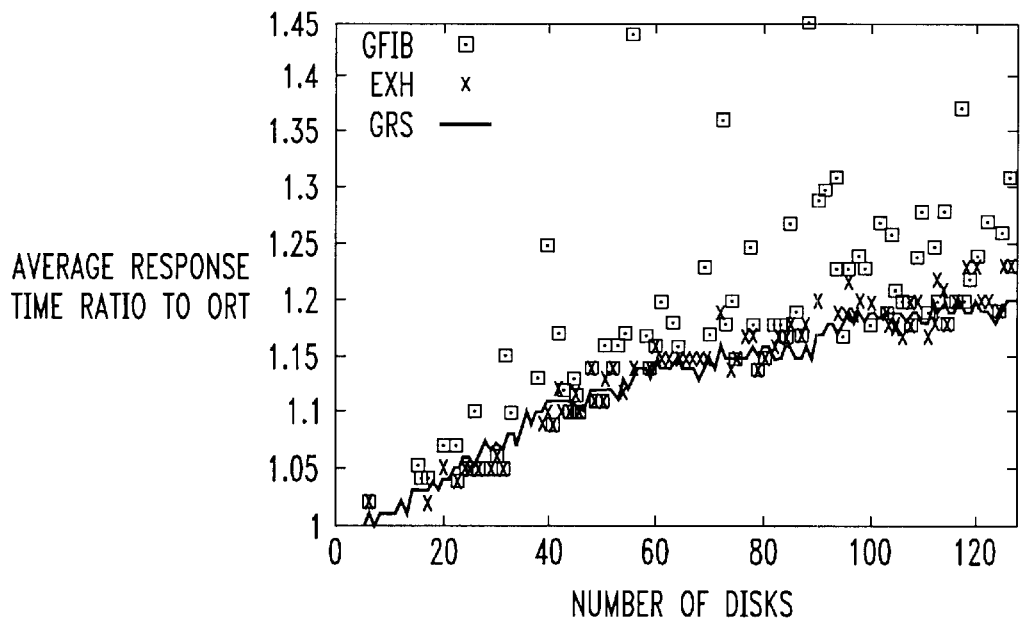
FIG. 10 compares performance of the present declustering scheme with the two known schemes on an average-by-shape cost metric basis.
Figure 11:
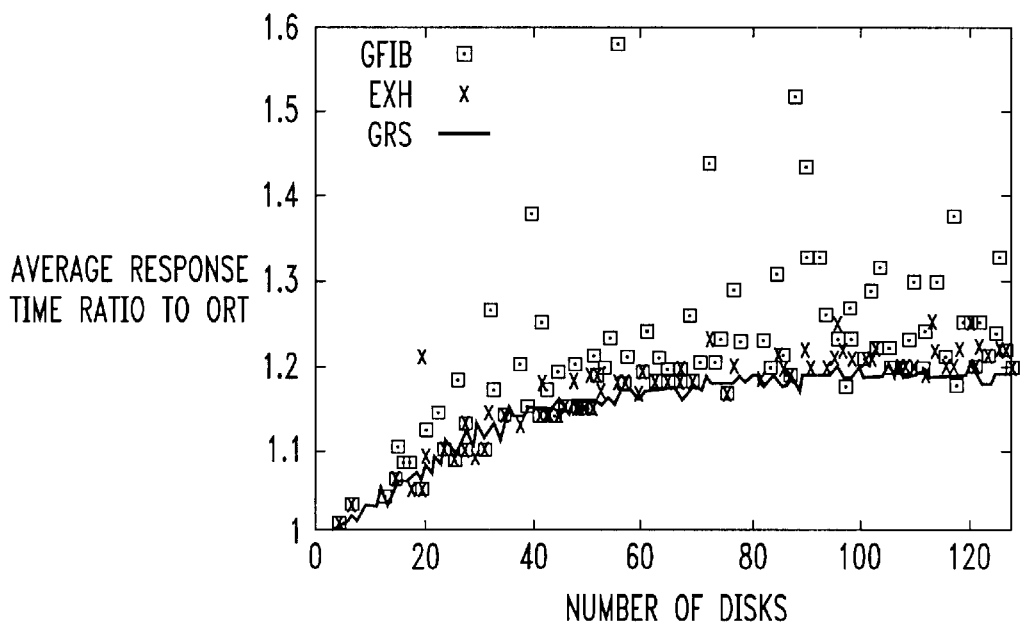
FIG. 11 compares performance of the declustering schemes on the basis of an average-by-all cost metric.

FIGS. 9, 10, and 11 show performance under the various cost metrics. Note the EXH searches for the best skip value based on the "average-by-area" cost metric. To increase readability of the figures, GRS is plotted in a solid line and the other two schemes as discrete data points. Points of GFIB and EXH that have the same value as GRS are also hidden (so the curve of GRS can be seen). In the figures, note that GFIB shows many variations away from the performance of EXH and GRS. The performance of EXH and GRS are relatively close, however.

For a closer comparison, Table 1 below lists, for each scheme, the frequency (out of all the values of M) at which the scheme performs best (including ties) among the three. It is seen that GRS has the most wins under all three cost criteria. EXH is better than GRS only under the "average-by-area" metric, because that is the metric for which EXH is optimized.

|  | GRS | GFIB | EXH |
| --- | --- | --- | --- |
| average-by-all | 102 | 42 | 70 |
| average-by-area | 84 | 58 | 96 |
| average-by-shape | 94 | 50 | 77 |

Figure 12:
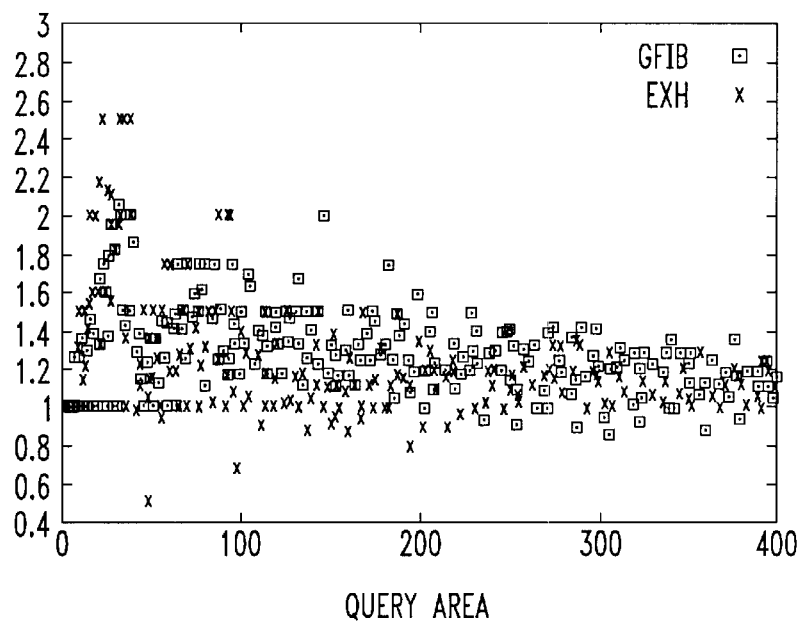
FIG. 12 shows an average response time ratio of the two known schemes to the present scheme as a function of query areas.

FIG. 12 suggests a range of query sizes for which GRS shows the best improvement over GFIB and EXH. The figure displays average response time ratios of GFIB and EXH to GRS along all possible query areas when 56 disks are used. As shown, the improvement is greatest when the query area is between 20 and 100, and diminishes as the query area approaches one as well as when it increases beyond 100.

Figure 13:
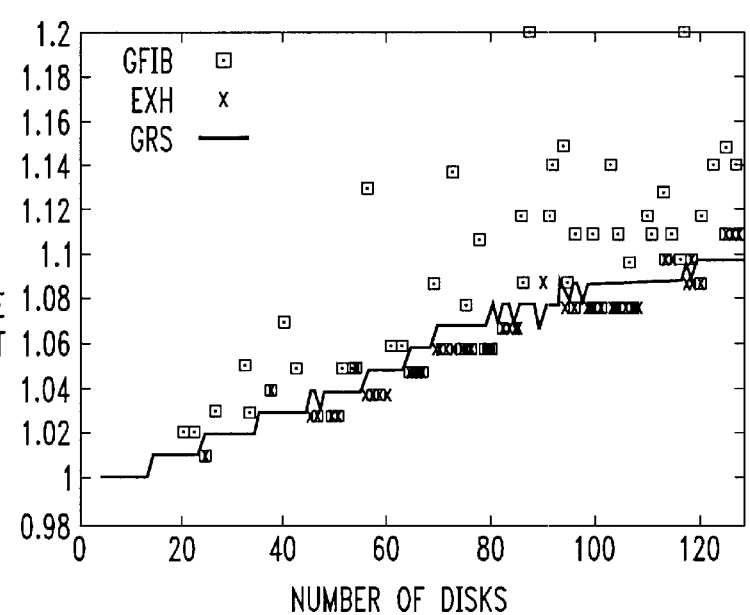
FIG. 13 compares the present and the two known schemes using an average-by-area cost metric.

FIG. 13 shows performance (in average-by-area cost metric) of the schemes for a 64×64 grid. It reveals no substantial difference from the result for the 32×32 grid in FIG. 9 on the relative performance of the schemes.

Three-Dimensional Data

Figure 14:
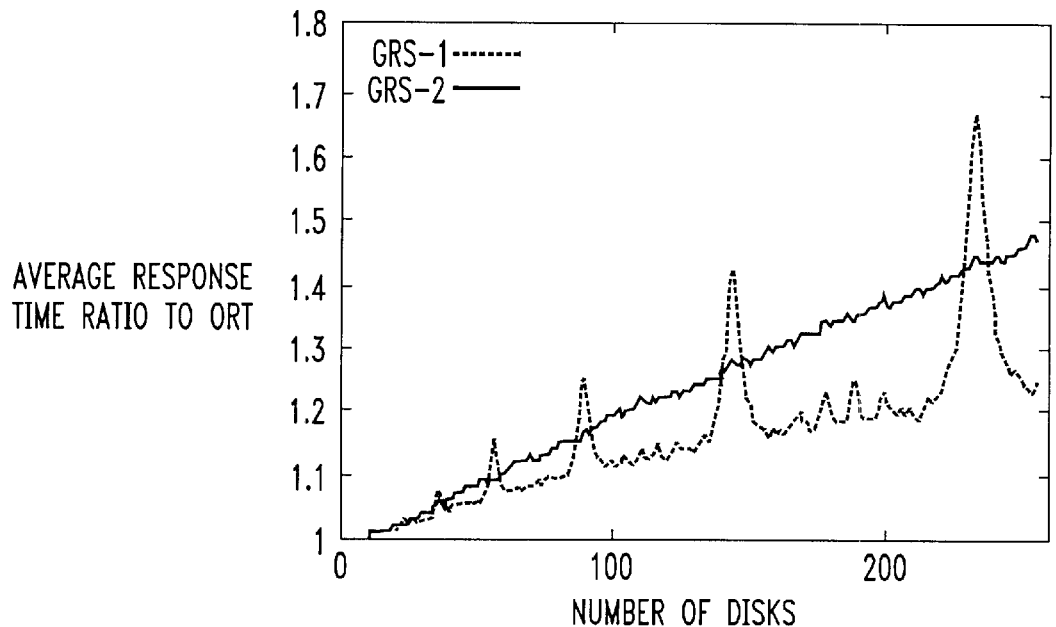
FIG. 14 shows performance of three-dimensional versions of the present declustering scheme using an average-by-area cost metric.

In a first set of experiments, a grid of size 32×32×32 was used. A set of $32^3$=32768 random queries were generated in evaluating the average response time of the schemes. FIG. 14 shows the results for GRS-1 and GRS-2. Observe that GRS-1 has better performance than GRS-2 in general, but exhibits high peaks when M is near Fibonacci numbers. GRS-2, on the other hand, exhibits no such peaks, but the response time is higher otherwise. Thus, a hybrid scheme that uses GRS-1 at non-Fibonacci numbers and uses GRS-2 when M approaches Fibonacci numbers, is suggested.

Figure 15:
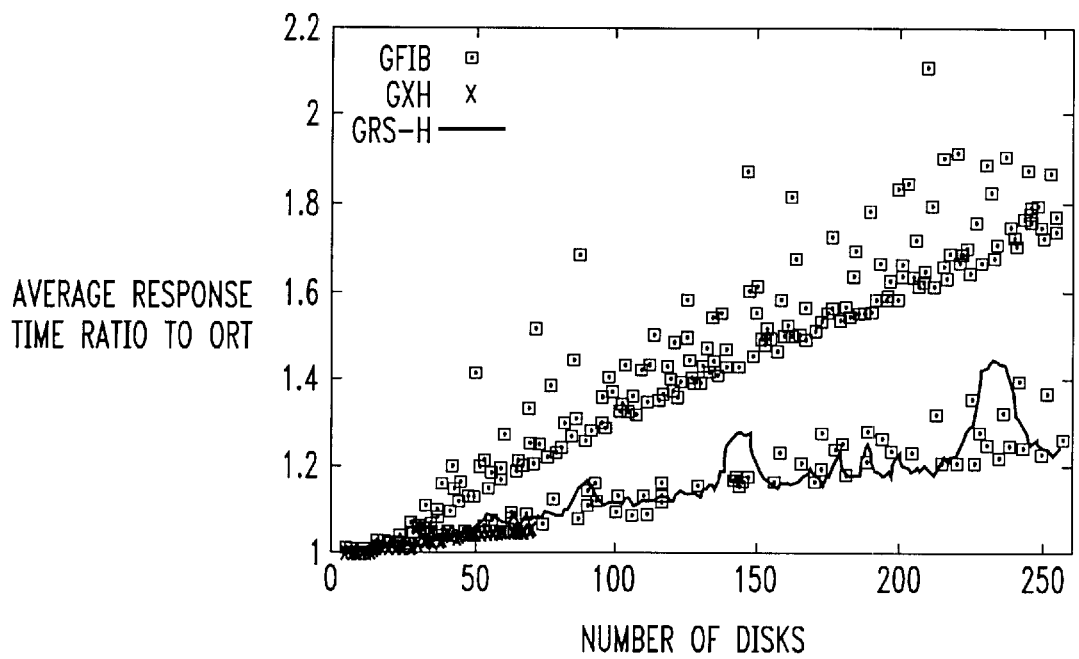
FIG. 15 compares performance of a hybrid version of the present three dimensional declustering scheme with the two known schemes using an average-by-area cost metric.

FIG. 15 compares the performance of such a hybrid GRS scheme (GRS-H) with GFIB and EXH. Again, the results show that the performance of GFIB does not scale well as M increases. The GRS-H scheme offers competitive performance to EXH for M≦70 (the differences are less than 0.04). It also produces decent performance for M>70, for which an EXH solution is too costly to obtain.

Figure 16:
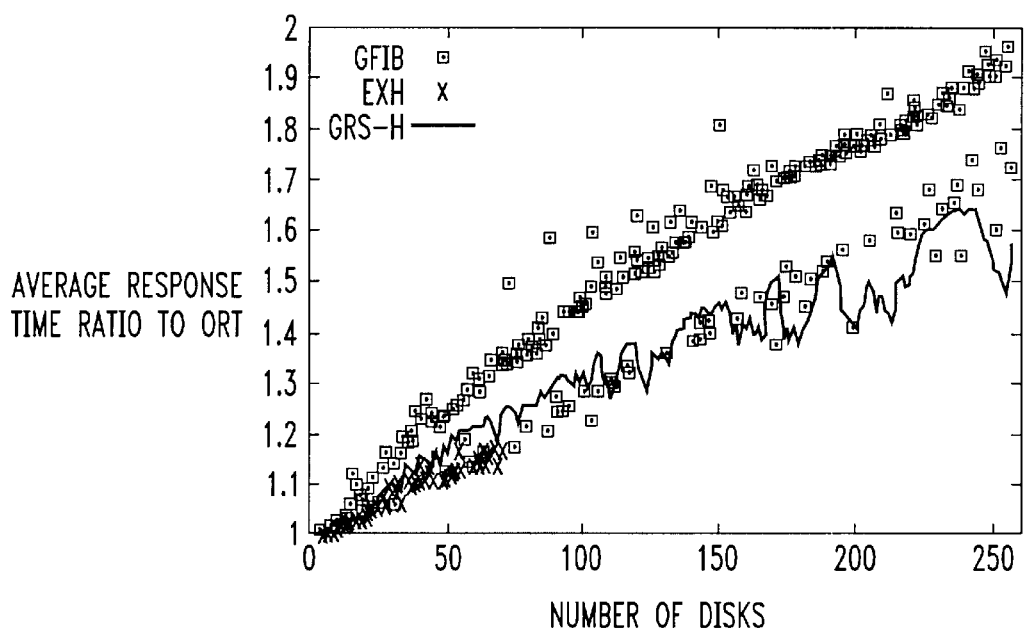
FIG. 16 shows performance of the present three-dimensional hybrid declustering scheme and the two known schemes using an average-by-area cost metric.

Tests were also performed with grids having unequal dimension lengths. FIG. 16 shows results using a grid of size 32×14×9. It is seen that GRS still gives more consistent and better performance than GFIB. GRS also performs close to EXH when M≧70 (the differences are within 0.08).

The simulation results show that the present GRS scheme outperforms the GFIB scheme, and performs comparably to the EXH scheme, the latter requiring substantial computational overhead thus making it practically infeasible.

Simulations have shown that GRS is a best possible scheme for M≦22; has a response time of at most one more than that of a best possible scheme for M≦94; and has a response time of at most three more than that of a best possible scheme for any reasonable numbers of disks (≦550). The nearly overall optimal performance of the present scheme makes it highly desirable.

Also, whenever M (number of disks) is a Fibonacci number, the present GRS scheme has almost optimal performance (both average case and worst case). Extensive simulations have shown that performance of the present scheme varies smoothly with M, which strongly implies that the scheme has good behavior for all values of M.

While the foregoing description represents preferred embodiments of the invention, it will be obvious to those skilled in the art that various changes and modifications may be made, without departing from the spirit and scope of the invention pointed out by the following claims.

We claim:

1. A method of declustering and storing data blocks (x, y) of a two-dimensional dataset among a number of storage units for reducing response time of queries concerning a desired range of said data blocks in the x and y dimensions of the dataset once the data blocks are stored on the units, comprising:

providing a number (M) of said storage units;

defining M pairs (i, $key_i$) wherein i=0,1, . . . ,M−1, and $key_i$ is the fractional part of $2i/(1+\sqrt{5})$;

ordering first components of said pairs according to an ascending order of corresponding $key_i$ values of the pairs, thus defining a permutation array A of size M;

defining another permutation array B such that for i=0, 1, . . . ,M−1, B[A[i]]=i; and assigning data block (x, y) to storage unit m=(x−B[y mod M]) mod M, wherein mod is the remainder function.

2. The method of claim 1, including providing the storage units in the form of disks.

3. The method of claim 1, including selecting the number of storage units to be a Fibonacci number greater than one.

4. A method of declustering and storing data points ($x_1$, $x_2$, . . . , $x_d$) of a multi-dimensional dataset among a number of storage units for reducing response time of queries concerning desired ranges of the data points in the d dimensions of the dataset once the data points are stored on the units, comprising:

providing a number (M) of storage units;

defining M pairs of (i, $key_i$) where i=0, 1, . . . , M−1, and $key_i$ is selected as the fractional part of $(2i/(1+\sqrt{5})$;

ordering first components of said pairs according to an ascending order of corresponding $key_i$ values of the pairs, thus defining a permutation array A of size M;

defining another permutation array B such that for i=0, 1, . . . ,M−1, B[A(i)]=i; and assigning data point ($x_1$, $x_2$, . . . , $x_d$) to storage unit m=($x_d$−B($x_{d-1}$−B($x_{d-2}$− . . . )), wherein all operations are modulo M.

5. The method of claim 4, including providing the storage units in the form of disks.

6. A method of declustering and storing data points (x, y, z) of a three-dimensional dataset among a number of storage units for reducing response time of queries concerning desired ranges of said data points in the x, y and z dimensions of the data set once the data points are stored on the units, comprising:

providing a number (M) of storage units;

first defining M pairs (i, $key_i$) wherein i=0,1, . . . ,M−1, and $key_i$ is the fractional part of $(2/(1+\sqrt{5}))^2 i$;

ordering first components of said pairs according to an ascending order of corresponding $key_i$ values of the pairs, thus defining a permutation array A of size M;

defining a second permutation array $GRS_2^{-1}$ such that for i=0,1, . . . ,M−1, $GRS_2^{-1}[A(i)]=i$;

repeating said first defining and said ordering steps, while modifying said first defining step by selecting $key_i$ as the fractional part of $(2/(1+\sqrt{5}))^3 i$;

defining a third permutation array $GRS_3^{-1}$ such that for i=0,1, . . . , M−1, $GRS_3^{-1}[A(i)]=i$; and assigning data point (x, y, z) to storage unit m=(x−$GRS_2^{-1}$(y mod M)−$GRS_3^{-1}$(z mod M)mod M, wherein mod is the remainder function.

7. The method of claim 6, including providing the storage units in the form of disks.

8. The method of claim 6, including selecting the number of storage units to be a Fibonacci number greater than one.

* * * * *